United States Patent
Izadi et al.

(10) Patent No.: US 6,324,831 B1
(45) Date of Patent: Dec. 4, 2001

(54) MONOROTOR FOR A GAS TURBINE ENGINE

(75) Inventors: Said Izadi; Richard L. Elgin, both of San Diego, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 09/491,050

(22) Filed: Jan. 25, 2000

(51) Int. Cl.$^7$ ........................................... F02L 3/06
(52) U.S. Cl. ................... 60/39.36; 60/39.75; 29/889.21
(58) Field of Search ................. 60/39.36, 39.75; 29/889.21, 889.23, 889.4

(56) References Cited

U.S. PATENT DOCUMENTS

| | | |
|---|---|---|
| 2,822,974 | 2/1958 | Mueller . |
| 4,122,673 * | 10/1978 | Leins ........................... 60/274 |
| 4,177,638 * | 12/1979 | Wood .......................... 60/39.51 H |
| 4,424,003 * | 1/1984 | Brobeck ........................ 416/241 B |
| 4,490,622 * | 12/1984 | Osborn .......................... 290/52 |
| 4,521,155 * | 6/1985 | Osborn .......................... 415/190 |
| 4,705,463 * | 11/1987 | Joco ............................ 417/407 |
| 4,798,320 | 1/1989 | Fang . |
| 4,872,817 * | 10/1989 | De Kruif ....................... 417/407 |
| 4,962,586 | 10/1990 | Clark et al. . |
| 5,129,284 * | 7/1992 | Brueckner et al. ............... 74/73 R |
| 5,129,784 * | 7/1992 | Yoshikawa ..................... 415/216.1 |
| 5,549,449 * | 8/1996 | McInerney ..................... 415/177 |
| 5,639,209 * | 6/1997 | Pollini ......................... 415/116 |

FOREIGN PATENT DOCUMENTS 5987938   5/1984   (JP) .

* cited by examiner

Primary Examiner—Charles G. Freay
Assistant Examiner—Ehud Gartenberg
(74) Attorney, Agent, or Firm—Wood Phillips VanSanten Clark & Mortimer

(57) ABSTRACT

High inertia and large bearing loads encountered in monorotors for gas turbine engines are reduced in a monorotor having a compressor wheel section (10) made of a relatively low density material while the turbine wheel section (12) maintains resistance to heat by being made of a relatively higher density, heat resistant material. The two are joined into a monorotor through the use of two bodies (24,38) which are inertia welded to the respective wheels (10,12) and then welded together by any one of a variety of welding processes.

16 Claims, 4 Drawing Sheets

MONOROTOR FOR A GAS TURBINE ENGINE

FIELD OF THE INVENTION

This invention relates to gas turbine engines, and more particularly, to rotors employed in gas turbine engines. Even more particularly, the invention relates to monorotors for gas turbine engines.

BACKGROUND OF THE INVENTION

Radial flow, gas turbine engines have long been known and employed in a variety of applications. Quite obviously, they are desirable for those applications where axial compactness is required. They have also seen extensive use in applications where their relative simplicity is highly desirable as, for example, in auxiliary power units for aircraft. Indeed, they have even been employed in thrust jet applications for small aerodynamic vehicles as, for example, drones and cruise missiles.

Many of today's radial flow, gas turbine engines employ so-called "monorotors" wherein the monorotor consists of a single rotating mass defining both the compressor section and the turbine wheel section of the engine. Because the rotor must stand up to the high temperatures encountered in the hot section of the engine, i.e., the temperatures to which the turbine wheel section of the monorotor is exposed, it is made of a single alloy. Typically, the alloy employed is a cast nickel based superalloy which will accommodate the elevated temperature that is experienced in the hot section. Alloys such as nickel based superalloys or the like, while providing excellent resistance to the high temperatures encountered, have substantial density and thus result in a monorotor having a relatively high mass. The relatively high mass of the monorotor results in relatively large inertia which in turn makes the engine more difficult to start than would be the case if the inertia of the rotor was less. Similarly, the high mass of such monorotors results in relatively high loading of the engine bearings. Such loading can, in turn, require larger bearings than would otherwise be necessary and/or result in a shorter useful life of the gas turbine engine and/or necessitate the use of improved lubrication systems.

All of the foregoing contributes to the cost of the gas turbine engine, as well as affects its reliability in terms of ease of starting, longevity, etc.

The present invention is directed to overcoming one or more of the above problems.

SUMMARY OF THE INVENTION

It is the principal object of the invention to provide a new and improved monorotor for a gas turbine engine. More specifically, it is an object of the invention to provide a new and improved method of making a monorotor for a gas turbine engine. It is also an object of the invention to provide a new and improved monorotor for a gas turbine engine, as well as a gas turbine engine incorporating the new and improved monorotor.

According to one facet of the invention, there is provided a method of making a monorotor for a gas turbine engine which comprises the steps of:

(a) providing a turbine section of the rotor fabricated of a nickel based alloy of high temperature resistance and having an intended axis of rotation;

(b) providing a compressor section of the rotor fabricated of a relatively low density alloy selected from the group consisting of titanium, aluminum, zirconium, and vanadium based alloys, and having an intended axis of rotation;

(c) inertia welding a body of stainless steel or niobium alloy to each of said turbine section and said compressor section on the irrespective intended axes of rotation; and (d) thereafter metallurgically bonding the bodies together so that the intended axes of rotation are concentric.

In a preferred embodiment, both of the bodies are stub shafts.

In one form of the method, step (d) is preceded by the step of machining the bodies so they may be fitted together in a desired orientation with the intended axes of rotation concentric, and fitting the bodies together in the desired orientation prior to the performance of step (d).

Still another facet of the invention contemplates that step (d) is performed by a welding process selected from the group consisting of laser, electron beam, inertia and TIG welding.

In a highly preferred embodiment of the invention, the welding process is laser welding or electron beam welding.

In a highly preferred embodiment of the invention, the bodies are formed of stainless steel and in an even more preferred embodiment of the invention, the stainless steel is wrought stainless steel.

According to another facet of the invention, a monorotor for a gas turbine engine is provided. The gas turbine engine is of the type having a hot section containing a turbine wheel and a cold section containing a rotary compressor wheel joined to the turbine wheel for rotation therewith. The monorotor of the invention includes a turbine wheel formed of a material resistant to high temperatures and rotatable about an axis along with a rotary compressor wheel formed of a material different from the turbine wheel and having a lesser density than the turbine wheel material. The compressor wheel is also rotatable about the axis.

A first body of a material different from those of the turbine and compressor wheels is provided and is metallurgically bonded to one of the wheels.

A second body of material that is also different from those of the turbine and compressor wheels is metallurgically bonded to the other of the wheels. The monorotor is completed by a weld metallurgically bonding the bodies together for joint rotation about the axis.

In a preferred embodiment, the bodies are both stub shafts. In an embodiment of the invention that is preferred, the turbine wheel material is a nickel based alloy and the first and second bodies are formed of a material selected from the group consisting of stainless steel or niobium based alloys; and the compressor wheel material is selected from the group consisting of alloys based on titanium, aluminum, zirconium, and vanadium.

The invention also contemplates a gas turbine engine which includes a compressor shroud with a combustion air inlet in the shroud. An annular combustor defines an engine axis and the combustor receives combustion air from an outlet from the compressor shroud. A monorotor made as set forth previously is oriented with the compressor wheel being disposed in the compressor shroud and the turbine wheel within the annular combustor and receiving gases of combustion therefrom. The monorotor axis is concentric with the engine axis.

Other objects and advantages will become apparent from the following specification taken in connection with the accompanying drawings.

DESCRIPTION OF THE PREFERRED EMBODIMENTS

Figure 1:
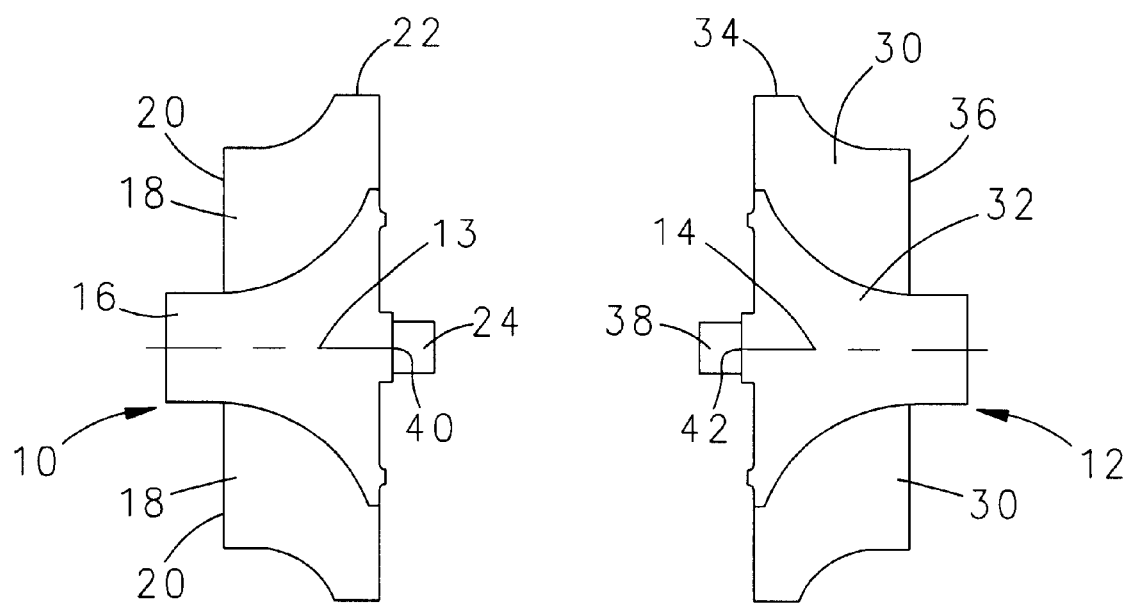
FIG. 1 is a side elevation of a monorotor made according to the invention prior to assembly of the compressor section thereof to the turbine wheel section thereof.
Figure 2:
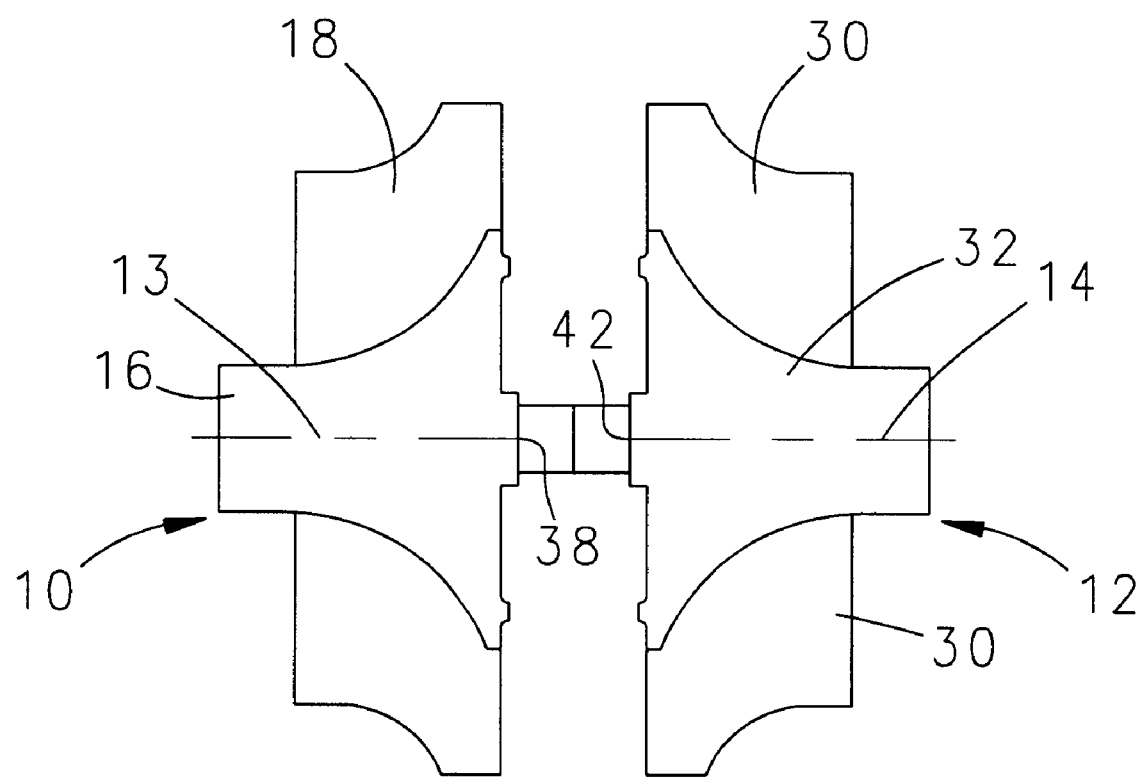
FIG. 2 is a view similar to FIG. 1 but showing the two sections assembled to one another.

An exemplary embodiment of a monorotor made according to the invention is shown in an unassembled state in FIG. 1 and in an assembled state in FIG. 2. Referring to both of those figures, the monorotor is seen to include a compressor section, generally designated 10 and a turbine wheel section, generally designated 12. Each is rotatable about an axis 13,14 respectively, and in the assembled monorotor, the axes 13 and 14 are co-axial or concentric.

The compressor section 10 includes a hub 16 from which a plurality of compressor blades or vanes 18 of conventional configuration extend. Each of the vanes 18 includes an inlet edge 20 and a discharge edge 22, the latter discharging radially.

On the side of the hub 16 remote from the inlet edges 20 of the vanes 18, and on the rotational axis 12, a body 24 is metallurgically bonded to the compressor wheel section 10. The nature and purpose of this bonding will be described in greater detail hereinafter.

Viewing the turbine wheel section 12, the same includes a plurality of vanes 30 of conventional configuration which extend outwardly from a hub 32. The vanes 30 have an inlet edge 34 and a discharge edge 36. As is well known, in a radial turbine, gases of combustion are directed radially inwardly toward the edges 34 to cause rotation of the turbine wheel 12 about the axis 14.

On the side of the hub 32 remote from the discharge edges 36 of the vanes 30, a further body 38 of material is attached to the turbine wheel section 12 at the rotational axis 14.

According to the invention, the compressor wheel section 10 is either cast or machined from wrought titanium or aluminum alloy. In some cases, vanadium or zirconium alloys may be employed. Suitable titanium alloys include AMS 4967, 4976 and 4981. In contrast, the turbine wheel section 12 is cast or machined from a forging of a nickel based alloy which preferably, but need not be, a so-called superalloy. In any event, the alloy of which the turbine wheel section 12 is formed is such as to have the necessary resistance to heat so as to stand up to the hot gases of combustion applied to the vanes 30. Suitable nickel based alloys include IN792, MAR M-247, and IN100.

The bodies 24 and 38 preferably are in the form of stub shafts, although other configurations could be employed. Each will typically be formed of stainless steel or a niobium based alloy. Stainless steel is preferred and of the stainless steels, a wrought stainless steel is even more preferred. One suitable type is stainless steel 304L (AMS 5647).

The stub shafts 24 and 36 are inertia welded to the respective wheels 10 and 12. Preferably, the inertia welding is a conventional form of inertia welding such as that described by MIL standard 1252. Inertia welding of the stub shaft 24 to the compressor wheel 10 occurs at an interface 40 while inertia welding of the stub shaft 38 to the turbine wheel section 12 occurs at an interface 42. The point of the process is to obtain a metallurgical bond between the stub shafts 24,38 and the hubs 16,32 of the respective wheel sections 10,12.

Figure 3:
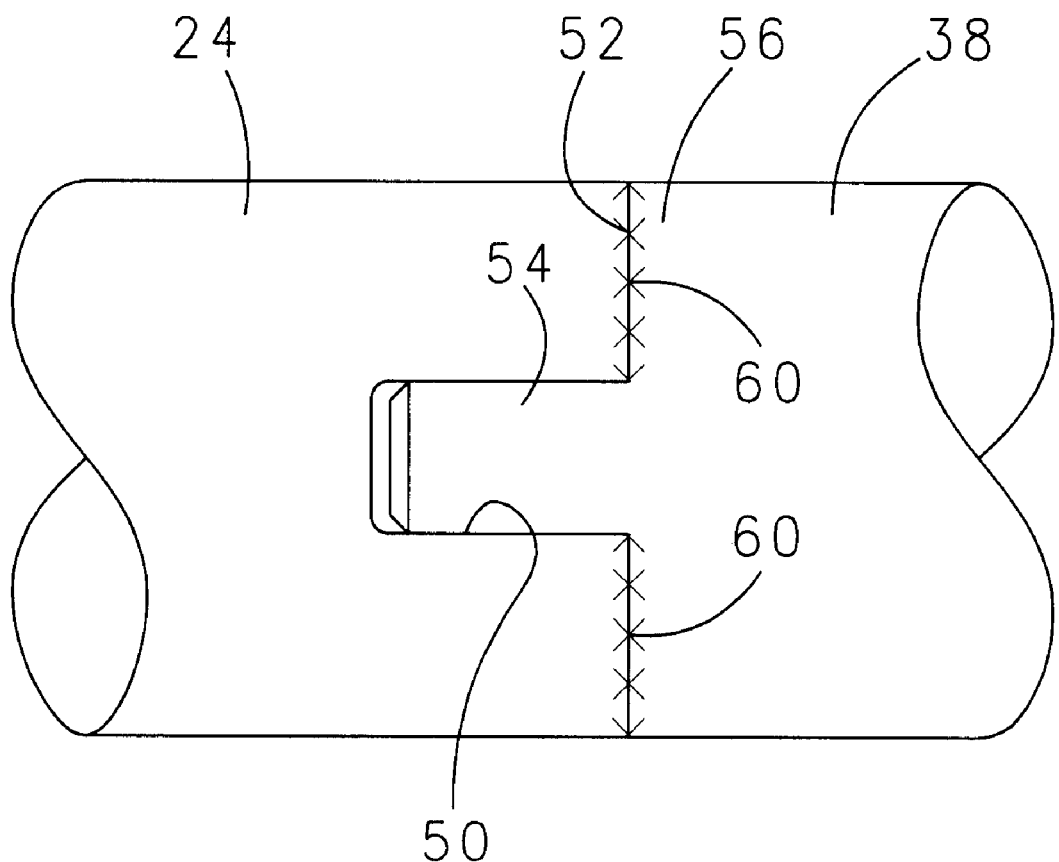
FIG. 3 is an enlarged, sectional view of the point at which the compressor and turbine wheel sections are joined together.

Once that has occurred, the stub shafts 24,38 may be machined prior to final assembly of the monorotor so that the proper orientation of one to the other in the final assembled state is obtained. For example, and with reference to FIG. 3, the stub shaft 24 may be provided with a central bore opening on the end 52 of the stub shaft 24 facing the stub shaft 38. Similarly, the stub shaft 38 may include a mating stud or finger 54 which is received in the bore 50 in a snug fashion. The finger or stud 54 is located on an end 56 of the stub shaft 38 that faces the stub shaft 40 and, in fact, may be abutted against the stub shaft 24. To this end, the axial length of the projection 54 is less than that of the bore 50 to assure such abutment.

The two components, i.e., the compressor wheel section 10 and the turbine wheel section 12, may then be assembled and the stub shafts 24 and 38 joined at their ends 52,56 in a metallurgical bond. The bond is indicated schematically at 60 in FIG. 3 and is achieved by a welding process. The welding process may be electron beam welding, laser welding, inertia welding, or tungsten inert gas (TIG) welding. Electron beam welding or laser welding are preferred over TIG welding or inertia welding because lesser heat is generated in the process and better dimensional stability is possible. Specifically, in inertia welding, it is expected that there will be some difficulty encountered in controlling the axial separation or relationship of the stub shafts 24 and 38, and thus the compressor and turbine wheel 10, to one another. With TIG welding, there may be excessive heat and not enough working space between the compressor wheel section 10 and the turbine wheel section 12 to allow the welding process to be performed relatively easily.

In the usual case, the stub shafts 24 and 38 may be manufactured to be about 2" in length prior to their being inertia welded to the respective wheel 10,12. After they are joined by inertia welding to the respective wheels, the stub shafts 24,38 may then be machined to the desired length which may range from ¼" to 2" or more, dependent upon the ultimate size of the rotor to be formed. At this time, mating configurations such as described above in connection with FIG. 3 may be provided to assure that the proper orientation of the two parts relative to each other is achieved.

It will readily be appreciated that the above-identified materials which are intended to be used in forming the compressor wheel section 10 have a substantially lesser density than the nickel based, temperature resistant alloys which are employed to form the turbine wheel section 12. Because of this lesser density, the rotor will have less inertia and starting of the engine in which it is employed is made easier. Moreover, the overall mass of the rotor will be less, thereby lowering bearing loads to achieve an increase in the useful life of the engine and/or allow the use of smaller bearings and/or less sophisticated lubrication systems.

Figure 4:
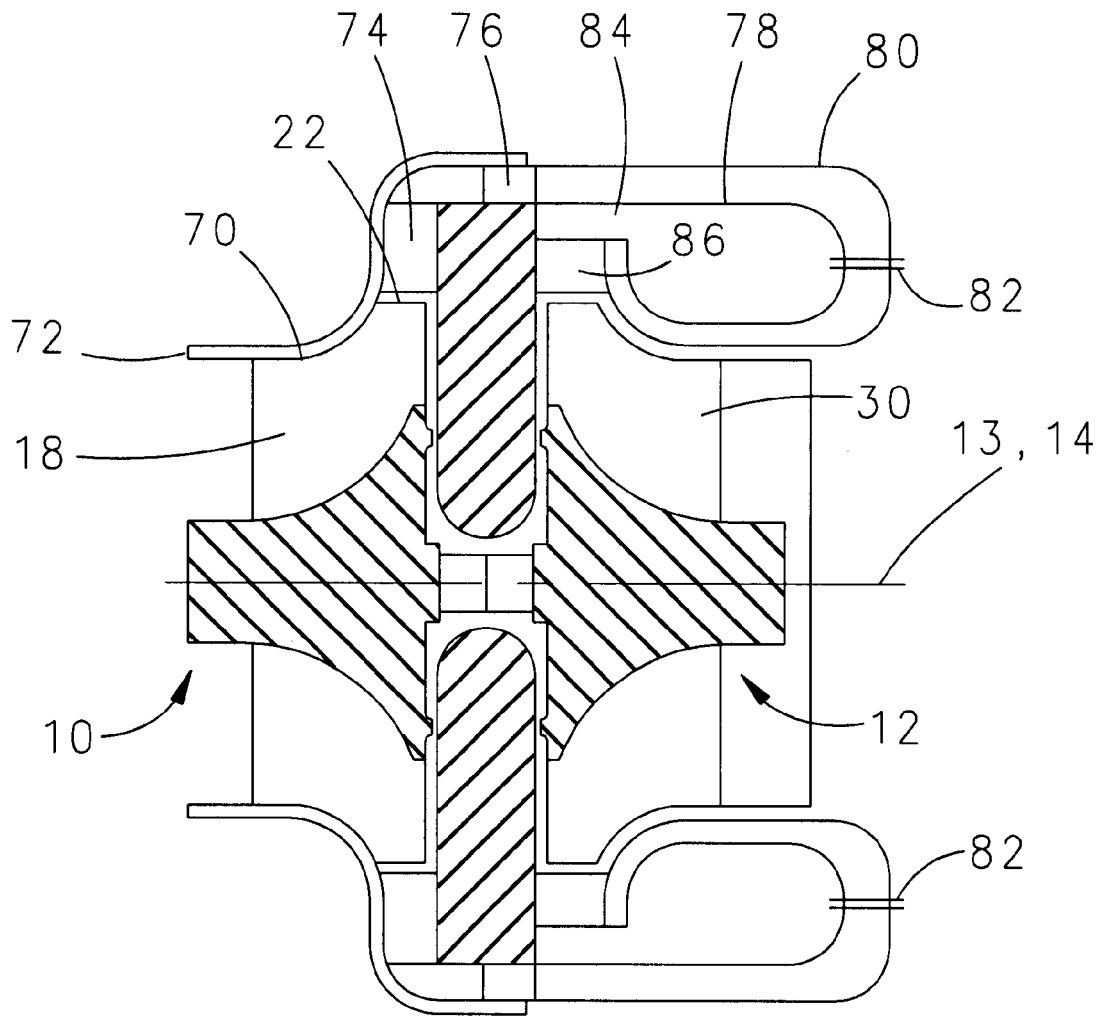
FIG. 4 is a somewhat schematic sectional view of a radial flow gas turbine engine employing a monorotor made according to the invention.

A typical engine employing a monorotor made according to the invention is illustrated in FIG. 4 in a somewhat schematic form. A compressor shroud 70 defines the cold section of the engine and is disposed about the compressor blades 18. The shroud 70 includes an inlet end 72 where air to be compressed and passed to a combustor enters the apparatus. Compressed air is discharged by the edges 22 of the blades 18 into a diffuser 74 and then turned to flow axially to de-swirling vanes 76 of a conventional construction.

The engine includes an annular combustor 78 forming part of the engine hot section which may be of any desired configuration and which is concentric about the axes 13,14. An engine housing 80 conducts combustion air around the annular combustor 78 with the air being admitted to the latter through openings in a conventional fashion. Fuel is also introduced into the annular combustor 78 by fuel injectors shown schematically at 82 to generate gases of combustion. The gases of combustion flow to an outlet end 84 of the annular combustor 78 to an annular nozzle 86 which directs the gases of combustion onto the vanes 30 of the turbine wheel section 12 to drive the same. By reason of its connection to the compressorwheel 10, the latter is also driven to provide the compressed air to the annular combustor 78 as mentioned previously.

Of course, because the inlet air is passing over the compressor wheel section 10, the same operates at a relatively cool temperature. On the other hand, hot gases of combustion exiting the annular combustor 78 are impinged against the turbine wheel section 12, but because of its construction of a nickel alloy, the same is able to readily withstand the high temperatures involved.

From the foregoing, it will be appreciated that a monorotor made according to the invention, in addition to incorporating all of the advantages of monorotors in use today, further has a lowered mass to provide for less inertia and easier starting, as well as to lighten bearing loads.

What is claimed is:

1. A method of making a monorotor for a gas turbine engine, comprising:
    (a) providing a turbine section of the rotor fabricated of a nickel based alloy of high temperature resistance and having an intended axis of rotation;
    (b) providing a compressor section of the rotor fabricated of a relatively low density alloy selected from the group consisting of titanium, aluminum, zirconium and vanadium based alloys and having an intended axis of rotation;
    (c) inertia welding a body of material selected from the group consisting of stainless steel and niobium based alloy to each of said turbine section and said compressor section on their respective intended axes of rotation; and
    (d) thereafter metallurgically bonding said bodies together so that said intended axes of rotation are concentric.

2. The method of claim 1 wherein said bodies are stub shafts.

3. The method of claim 1 wherein step (d) is preceded by the step of machining said bodies so they may be fitted together in a desired orientation with said intended axes of rotation concentric, and fitting said bodies together in said desired orientation prior to the performance of step (d).

4. The method of claim 1 wherein step (d) is performed by a welding process selected from the group consisting of laser, electron beam, inertia and TIG welding.

5. The method of claim 4 wherein said welding process is laser welding or electron beam welding.

6. The method of claim 1 wherein said bodies are formed of stainless steel.

7. The method of claim 6 wherein said stainless steel is wrought stainless steel.

8. A monorotor for a gas turbine engine made by the method of claim 1.

9. A monorotor for a gas turbine engine having a hot section containing a turbine wheel and a cold section containing a rotary compressor wheel joined to said turbine wheel for rotation therewith, said monorotor comprising:
    a turbine wheel formed of a material resistant to high temperatures and rotatable about an axis;
    a rotary compressor wheel formed of a material different from said turbine wheel and having a lesser density than the turbine wheel material, said compressor wheel being rotatable about said axis;
    a first body of a material different from those of said turbine and compressor wheels and metallurgically bonded to one of said wheels;
    a second body of a material different from those of said turbine and compressor wheels and metallurgically bonded to the other of said wheels; and
    a weld metallurgically bonding said bodies together for joint rotation about said axis.

10. The monorotor of claim 9 wherein said bodies are both stub shafts.

11. The monorotor of claim 9 wherein said turbine wheel material is a nickel based alloy; said first and second bodies are formed of a material selected from the group consisting of stainless steel and niobium based alloys; and said compressor wheel material is selected from the group consisting of titanium based, aluminum based, zirconium based and vanadium based alloys.

12. A gas turbine engine comprising:
    a compressor shroud;
    a combustion air inlet in said shroud;
    an annularly combustor defining an engine axis;
    said combustor receiving combustion air from an outlet from said shroud; and
    a monorotor made according to claim 9 oriented with said compressor wheel being disposed in said compressor shroud and said turbine wheel within said annular combustor and receiving gasses of combustion therefrom, said monorotor axis being concentric with said engine axis.

13. The gas turbine engine of claim 12 wherein said turbine wheel material is a temperature resistant, nickel based alloy.

14. The gas turbine engine of claim 12 wherein said nickel based alloy is a super alloy.

15. The gas turbine engine of claim 12 wherein said bodies are of a metallic material selected from the group consisting of niobium based alloys and stainless steel.

16. The gas turbine engine of claim 12 wherein said compressor wheel material is selected from the group consisting of alloys based on titanium, aluminum, zirconium and vanadium.

* * * * *